April 7, 1942.    C. H. H. RODANET    2,278,800
DEVICE FOR VERIFYING THE DIMENSION AND SPHERICITY OF BALLS
Filed Jan. 18, 1940    3 Sheets-Sheet 1

INVENTOR:
CHARLES HILAIRE HENRI RODANET
BY Haseltine, Lake & Co.
ATTORNEYS

April 7, 1942.     C. H. H. RODANET     2,278,800
DEVICE FOR VERIFYING THE DIMENSION AND SPHERICITY OF BALLS
Filed Jan. 18, 1940     3 Sheets-Sheet 2

INVENTOR:
CHARLES HILAIRE HENRI RODANET
BY Haseltine, Lake & Co.
ATTORNEYS

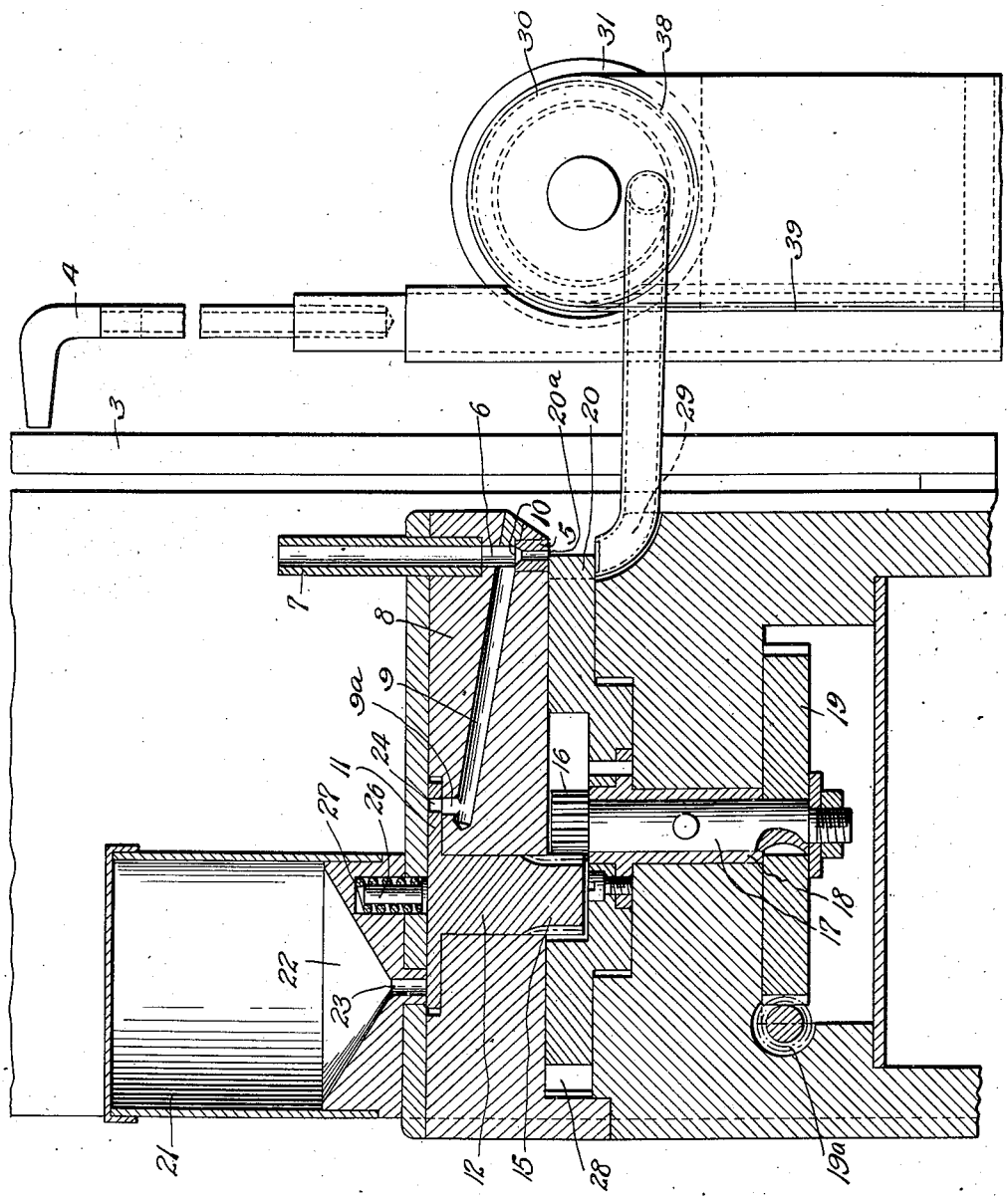

Patented Apr. 7, 1942

2,278,800

UNITED STATES PATENT OFFICE 2,278,800

DEVICE FOR VERIFYING THE DIMENSION AND SPHERICITY OF BALLS

Charles Hilaire Henri Rodanet, Neuilly-sur-Seine, France, assignor to Société Anonyme: Etablissements Ed. Jaeger, Levallois-Perret, Seine, France Application January 18, 1940, Serial No. 314,418
In France February 6, 1939

5 Claims. (Cl. 209—82)

For measuring or verifying machined parts, use is actually made of pneumatic devices of very high sensitiveness based on the principle of the measurement of the outflow of a fluid through an orifice opposite which is arranged the wall of the part or member to be measured or verified. The outflow of the fluid through said orifice is function of the distance of said orifice to the wall of the member and is translated by a variation of the pressure, constituting the measuring element and which exists in a chamber comprising said orifice as well as an inlet fed with a fluid under a constant pressure. When the distance separating the outlet orifice from the wall of the member to be measured, increases, the pressure in the chamber diminishes, and vice versa.

The present invention which allows of verifying the dimension and the sphericity of balls carries into practice, for the purpose indicated, the pneumatic measuring or verifying principle above set forth.

This invention, in its main feature, consists in the new application, to the verification of the dimension and sphericity of balls, without exerting on the latter a pressure as reduced as may be, capable of producing even an infinitesimal distortion, of the pneumatic or like means in which a variation of pressure is measured, resulting from a variation of the outflow of a fluid through an outflow orifice owing to the variation of the distance separating said orifice from the wall of the member to be measured or verified.

The means carrying into practice the main feature above defined, consist in bringing each ball into a rigorously cylindrical channel in communication with the chamber the pressure of which is measured and in maintaining said ball in said channel, whilst causing it to roll about in all directions so that all the large circles of the ball are located at least once in a plane at right angles to said cylindrical channel and passing substantially through the centre of the ball.

Air or other gas can be either sucked through the channel receiving the ball, by a suction effect exerted in the chamber the internal pressure of which is measured, or driven through said channel starting from said chamber.

An embodiment of a device or apparatus according to the invention, is characterised by the combination, in one and the same unit: of a ball magazine, or means for successively bringing one at a time, the balls into the control channel and of a driving rotary plate the periphery of which passes under the channel and which is adapted to support the ball at a point out of centre relatively to the vertical line passing through the centre of the ball.

In practice, the means for advancing the balls one by one, are constituted by a rotating disc or distributor provided with a perforation, said distributor being rotatively controlled by the driving members actuating the plate the periphery of which is preferably bevelled and provided with a notch for the discharge of the verified ball.

The device or apparatus previously defined is combined with a horizontal grading or sorting cylinder, arranged above receiving boxes or bins and which comprises ports distributed according to a helical line for instance, the cylinder being rotatively displaced, in function of the diameter of the ball, so as to place one of the ports in the lower position for ensuring the discharge of the ball in the bin corresponding to its diameter.

In practice, the rotation of the cylinder is related to the displacement of an index arranged opposite a column indicating the diameter and the sphericity of the ball. This column can belong to a liquid pressure-gauge which can be replaced by a mechanical apparatus forming an integrator.

The invention also extends to other particular points which will appear in the following text given with reference to the accompanying drawings, by way of example only, in which:

Fig. 3 is a section made according to line III—III of Fig. 1.

Fig. 5 is an enlarged fragmentary view of part of Fig. 2.

Figure 1:
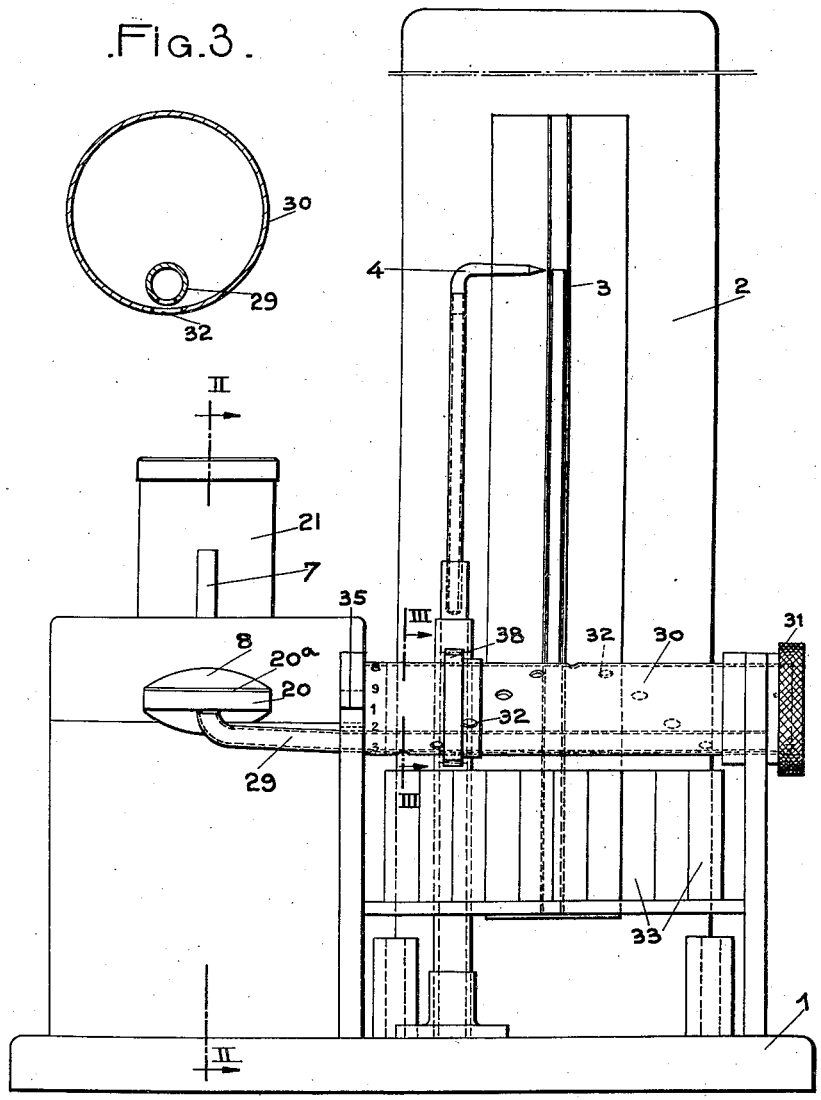
Fig. 1 is a general elevation of an apparatus devised according to the invention for verifying the sphericity of balls and for ensuring the sorting or grading thereof.

The apparatus illustrated by way of example only comprises a base 1 on which is mounted a micrometer 2 in particular of the "Solex" type as disclosed in Patent No. 1,982,528 granted to Marcel Mennesson on November 27, 1934, utilising the pneumatic measuring or verifying principle indicated in the preamble. This micrometer which is known per se, does not require a special description; it comprises a liquid column 3 opposite which can move a marking out index 4 controlled by the selecting drum 30, said column indicating the pressure existing in the chamber connected to the control outlet or orifice. In the example illustrated, said control orifice is constituted by a nozzle 5 connected, by a channel 6, to a tube 7 connected to said chamber controlling the micrometer.

The nozzle 5 is mounted in a plate 8 adapted to receive the tube 7 and the channel 6 in which opens a channel 9 admitting the balls into the nozzle 5. Said nozzle is perfectly cylindrical and has a flared upper part 10.

In the plate 8 is journalled a disc 11 embedded in said plate and the hub 12 of which is cut, at its lower part, for constituting a pinion 15 meshing with a pinion 16 cut at the end of a shaft 17.

On said shaft 17 are rigidly secured, on the one hand, a sleeve 18 and, on the other hand, a worm wheel 19 meshing with a worm 19ª rotatively driven by a motor not shown. On the sleeve 18 is rigidly secured a plate 20 driving the ball being verified. Above the distributor 11 is placed a reservoir 21 in which the balls are stored and the conical bottom 22 of which terminates in a discharging channel 23 opposite which can come in position a perforation 24 provided in the disc 11. Moreover, for avoiding any leakage of fluid passing through the tube 7 and which fills the channel 9, the lower face of disc 11 is pressed in a fluid-tight manner on the corresponding part of the plate 8, through the medium of a pushpiece 26, urged by a spring 27 and which acts axially on the disc 11.

Figure 2:
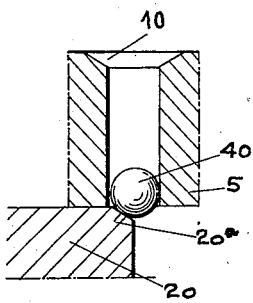
Fig. 2 is a corresponding side view with section made according to line II—II of the preceding figure.

Opposite the nozzle 5, but underneath the plate 20 which comprises a notch 28, is arranged a spout 29 receiving the verified balls, said spout leading to one of the ends of a horizontal cylinder 30 which can be rotatively moved by manually acting on a milled knob 31. The selecting cylinder 30 is provided with a series of holes 32 distributed substantially according to a helical line and which are arranged above corresponding boxes or bins 33 receiving the verified and sorted balls. The cylinder 30 also bears the figures 1, 2, 3 . . . 9 respectively corresponding to the holes 32 and which can be placed opposite a fixed reference mark 35 so that the hole corresponding to the figure placed opposite said reference mark, is arranged at the lower part for allowing the verified ball to be discharged into the bin corresponding to its diameter.

Figure 4:
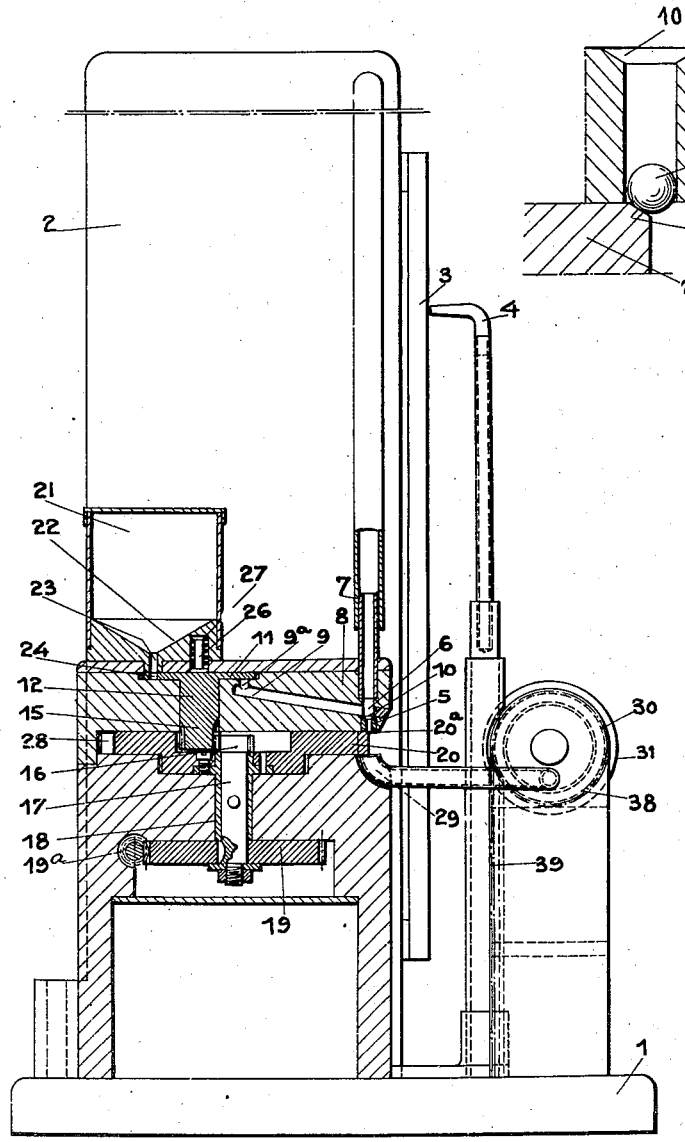
Fig. 4 is a detail view on a very large scale.

The operation of the apparatus previously described is as follows:

The balls to be verified and sorted being stored in the reservoir 21, the motor driving the worm 19ª is set in action as well as the source supplying the fluid at a constant pressure to the micrometer. When the perforation 24 of the distributor 11 passes opposite the channel 23, it receives one ball and one only, the thickness of the distributing disc 11 being chosen for that purpose. Said ball is conveyed by the distributor opposite the channel or conduit 9ª in which it falls; said ball then rolls in the channel 9 and enters the nozzle 5 in which it is held by the periphery of the driving plate 20. It will be noted that the periphery of said plate 20 is provided with a bevel 20ª (see also Fig. 4) so that the point of contact of said bevel with the ball 40 being verified is out of centre relatively to the vertical line passing through the centre of the ball 40.

Consequently, the rotary displacement of the plate 20 causes the ball 40 to roll in all directions so that all its large circles are placed at least once horizontally in a plane at right angles to the axis of the nozzle 5, the ball being verified being nearly entirely engaged in said nozzle.

The outflow of the fluid, in the free space comprised between the periphery of the ball 40 and the corresponding inner wall of the nozzle 5, is function of the section of the free passageway determined by a horizontal plane at right angles to the axis of the nozzle and passing through the centre of the ball. This free space is substantially in the shape of a crescent or a ring. If the ball is perfectly spherical, said section of passageway remains rigorously constant notwithstanding the rolling about of the ball, in all directions under the action of the rotatively movable plate 20.

In these conditions, the level of the column 3 remains constant and indicates at the same time the diameter of the ball. The index 4 is directly controlled by the drum 30 and the latter being placed opposite the level of the water column 3, one of the orifices 32 of the selecting device is located opposite the spout 29. The index 4 is moved opposite the level of the column by acting on the milled knob 31, the drum 30 being provided with a gear 38 meshing with a rack 39 rigid with said index 4. Said representation of the index opposite the end of the column automatically ensures the sorting of the balls with differences which are smaller than a micron. After the plate 20 has angularly moved to the extent of 360°, the notch 28 comes opposite the nozzle 5 and the verified ball falls in the spout 29 which guides it to the drum 30. As the selecting drum has been previously arranged, as above indicated, so that the perforation 32 corresponding to the diameter of the ball, is placed at the lower part, said ball passes through said perforation and falls into the corresponding selecting bin 33.

In the case in which the ball is not perfectly spherical, this defect and the very value of the latter are indicated by the variations of the level in the column 3 during verification. In the case of a nonspherical ball, the drum 30 is placed in such a manner as to discharge the ball into a bin for rejects.

When the plate 20 is moved slowly, the variations of column 3 are very apparent. If the plate moves rapidly, the column stabilizes at substantially an average height.

The liquid pressure-gauge 3 can be replaced by a mechanical apparatus forming integrator.

It will be noted that the passages of perforation 24 opposite the conduit 9ª and the notch 28, below the nozzle 5, are slightly offset (Fig. 5) so that the fall of a ball in the channel 9 follows with a slight delay the discharge of a ball through the spout 29. Moreover, the plate 20 and the disc 11 are moved at the same angular speed.

It is obvious that the embodiment described and illustrated is given herein only by way of indication and not in a limiting sense, as it is obvious that modifications are possible which do not alter in any way the main features above set forth.

What I claim as my invention and desire to secure by Letters Patent is:

1. In a device for verifying the dimension and the sphericity of balls, in combination: a pneumatic micrometer of the type in which the pressure of air or of a gas is measured, said pressure being maintained in a chamber in communication with the exterior through an orifice, a cylindrical conduit open for constituting said orifice, means for bringing the ball to be measured in said orifice, and means for imparting to said ball a rotary movement in all directions.

2. In a device for verifying the dimension and the sphericity of balls, in combination: a pneumatic micrometer of the type in which the pressure of air or of a gas is measured, said pressure being maintained in a chamber in communication with the exterior through an orifice, a cylindrical conduit open for constituting said orifice, means for bringing a ball in said conduit, a plate arranged below said conduit for retaining the ball, means for causing said plate to rotate and to impart a movement of rotation to said ball, and means on said plate for releasing said ball when said plate is in a definite angular position.

3. In a device for verifying the dimension and the sphericity of balls, in combination: a pneumatic micrometer of the type in which the pressure of air or of a gas is measured, said pressure being maintained in a chamber in communication with the exterior through an orifice, a cylindrical conduit open for constituting said orifice, means for bringing a ball in said conduit, a receptacle for the ball to be measured, a distributor for admitting one by one the balls from said receptacle to a conduit leading to said cylindrical conduit, a plate arranged below said conduit for retaining the ball, means for causing said plate to rotate and to impart a movement of rotation to said ball, and means on said plate for releasing said ball when said plate is in a definite angular position.

4. In a device for verifying the dimension and the sphericity of balls, in combination: a pneumatic micrometer of the type in which the pressure of air or of a gas is measured, said pressure being maintained in a chamber in communication with the exterior through an orifice, a cylindrical conduit open for constituting said orifice, means for bringing a ball in said conduit, a receptacle for the ball to be measured, a distributor for admitting one by one the balls from said receptacle to a conduit leading to said cylindrical conduit, a plate arranged below said conduit for retaining the balls by its periphery cut on a bevel, means for causing said plate to rotate in synchronism with the ball distributor and means provided on said plate for releasing the ball contained in the conduit when said plate is in a definite angular position.

5. In a device for verifying the dimension and the sphericity of balls, in combination: a pneumatic micrometer of the type in which the pressure of air or of a gas is measured, said pressure being maintained in a chamber in communication with the exterior through an orifice, a cylindrical conduit open for constituting said orifice, means for bringing a ball in said conduit, a receptacle for the ball to be measured, a distributor for admitting one by one the balls from said receptacle to a conduit leading to said cylindrical conduit, a plate arranged below said conduit for retaining the balls by its periphery cut on a bevel, means for causing said plate to rotate in synchronism with the ball distributor, a spout arranged below said plate, underneath said conduit for receiving the ball contained in the latter when a peripheral notch of the plate is placed in front of it, a sorting cylinder for receiving the ball admitted in said spout, and means for moving said cylinder in a definite angular position for discharging only the balls of a given diameter.

CHARLES HILAIRE HENRI RODANET.